United States Patent [19]
Gillis et al.

[11] Patent Number: 5,445,412
[45] Date of Patent: Aug. 29, 1995

[54] VEHICLE IMPACT DETECTION SYSTEM

[75] Inventors: Edward J. Gillis, Canton; Tony Gioutsos, Brighton; Dennis E. Palmer, South Lyon, all of Mich.

[73] Assignee: Automotive Systems Laboratory, Inc., Farmington Hills, Mich.

[21] Appl. No.: 207,279

[22] Filed: Mar. 7, 1994

[51] Int. Cl.⁶ ............................................. B60R 21/22
[52] U.S. Cl. .................................... 280/735; 180/268; 280/730.2
[58] Field of Search ............... 280/730 A, 735, 734; 180/268

[56] References Cited

U.S. PATENT DOCUMENTS

| | | | |
|---|---|---|---|
| 3,137,834 | 6/1964 | Pfann | 338/6 |
| 3,453,873 | 7/1969 | Lambert | 73/88.5 |
| 4,966,388 | 10/1990 | Warner et al. | 280/730 A |
| 4,995,639 | 2/1991 | Breed | 280/735 |
| 5,112,079 | 5/1992 | Haland et al. | 280/730 A |
| 5,164,901 | 11/1992 | Blackburn et al. | 364/424.05 |
| 5,172,790 | 10/1992 | Ishikawa et al. | 180/268 |
| 5,182,459 | 1/1993 | Okano et al. | 307/10.1 |
| 5,202,831 | 4/1993 | Blackburn et al. | 364/424.05 |
| 5,224,732 | 7/1993 | Warner et al. | 280/730 A |
| 5,229,943 | 7/1993 | Eigler et al. | 364/424.05 |
| 5,231,253 | 7/1993 | Breed et al. | 200/61.45 |
| 5,277,441 | 1/1994 | Sinnhuber | 280/730 A |
| 5,305,640 | 4/1994 | Boysel et al. | 73/517 R |

*Primary Examiner*—Kenneth R. Rice
*Attorney, Agent, or Firm*—Lyman R. Lyon

[57] ABSTRACT

A vehicle impact detection system (10) for controlling the actuation of an occupant safety restraint device (24) includes a sensor array (12) affixed to an outer surface (16) of the vehicle for continuously generating a two dimensional output (14) representative of the condition of the outer surface, and a processor/evaluation circuit (20) for performing advanced array signal processing on the sensor array output. The system (10) can reliably predict severe impacts within a few milliseconds of initial impact, and therefore is particularly suited for controlling the actuation of a safety restraint device in response to side impacts.

9 Claims, 1 Drawing Sheet

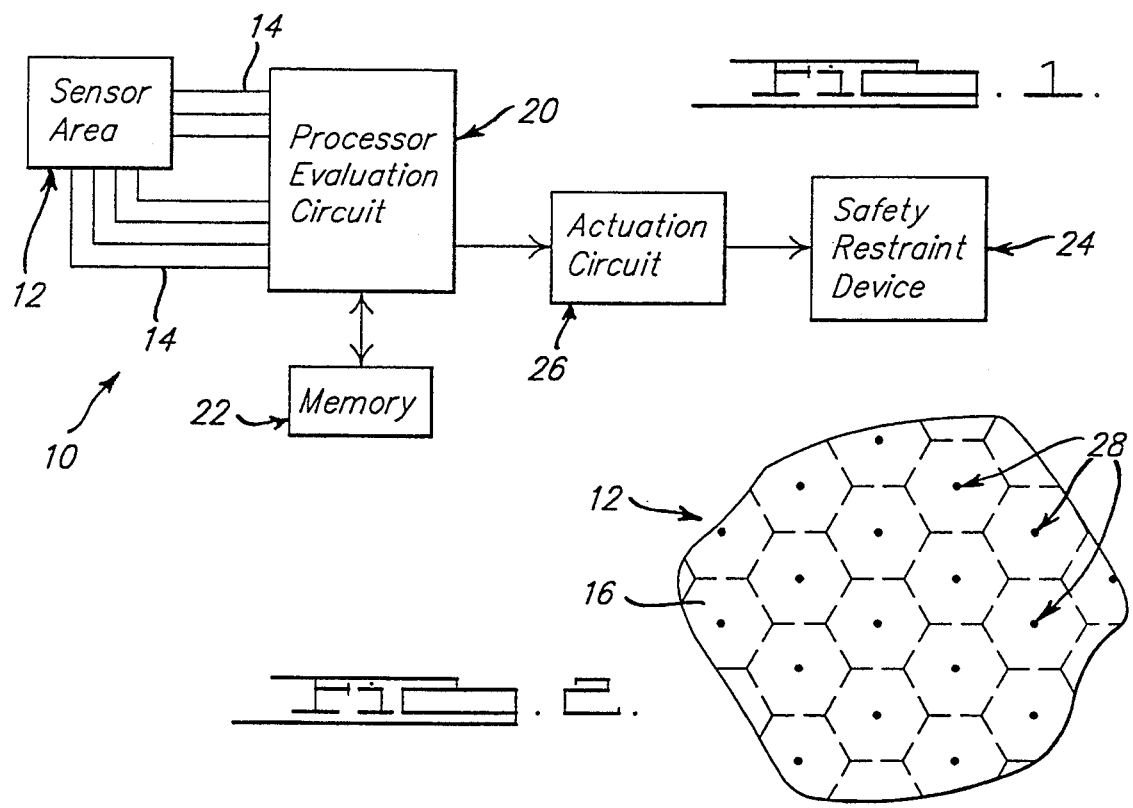
FIG. 1.
FIG. 2.
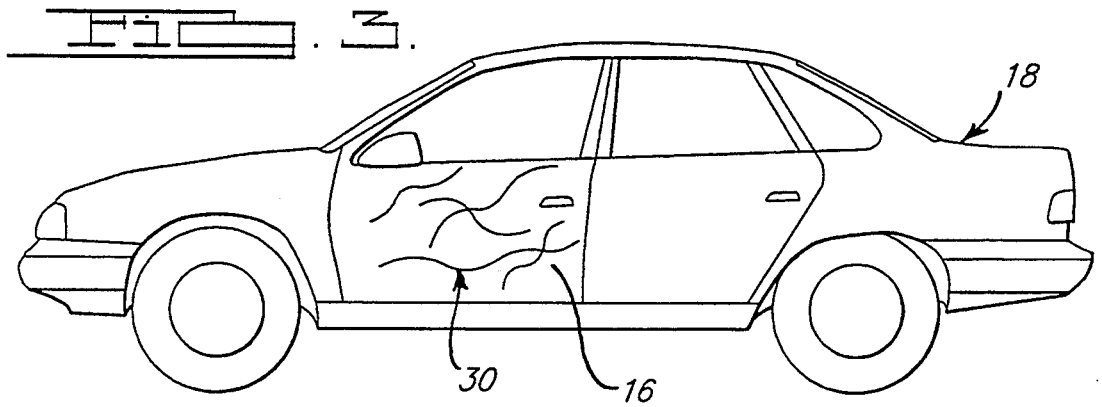
FIG. 3.
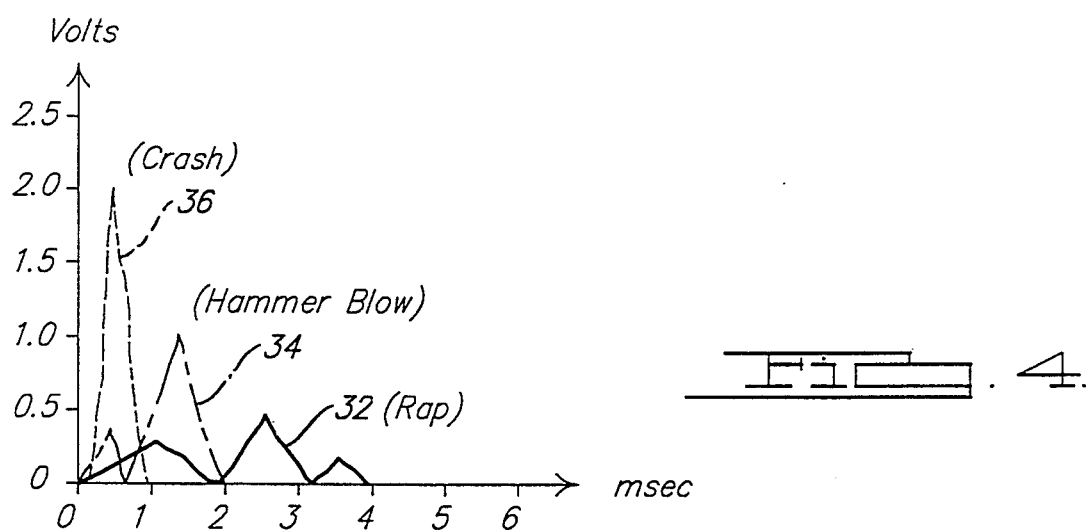
FIG. 4.

VEHICLE IMPACT DETECTION SYSTEM

BACKGROUND OF THE INVENTION

The present invention relates generally to a vehicle crash discrimination system for controlling deployment of a passenger safety restraint device, such as an air bag.

Conventional vehicle crash discrimination systems are primarily designed to protect vehicle occupants from frontal collisions. Frontal collision detection systems tend to employ sensors which use an inertial sensing mass to detect deceleration of the vehicle. Because of the distance between the vehicle occupants and frontal impact points on the vehicle, conventional inertial sensors provide satisfactory results when a deployment decision can be made at least 30–40 milliseconds after the initial impact.

However, conventional crash discrimination systems are simply inadequate when deployment decisions must be made within a few milliseconds, such as in side impacts. To accommodate this severely restricted decisional time period, known side impact detection systems rely on one of three sensor arrangements: a contact switch or crush sensor, a pressure transducer, or a modified silicon (inertial mass) accelerometer. Examples of such sensor arrangements can be found in U.S. Pat. No. 4,995,639 to Breed, U.S. Pat. No. 5,202,831 to Blackburn et al., U.S. Pat. No. 5,277,441 to Sinnhuber, and U.S. Pat. No. 5,231,253 to Breed et al.

While each one of these known sensor arrangements are more suitable than a modified conventional frontal crash discrimination system for side impact situations, each known arrangement suffers from inherent drawbacks. For example, contact switches only provide a one bit binary output (i.e., "on" or "off") which are typically based on the exceeding of a certain threshold of force. These thresholds must be carefully adjusted to allow the system to differentiate severe crashes from situations like door slams, opening of the door into a pole, etc. Pressure transducers only provide an output which is responsive to total force across the entire surface without being able to distinguish or isolate the force at different locations on the surface. Silicon accelerometers are only able to typically provide a very limited number of data samples within the allowed decision period, and therefore do not provide enough information to make reliable decisions. Furthermore, none of these known arrangements are suitable for reliably predicting the occurrence of a severe surface impact so that the safety restraint device can be actuated as early as possible.

SUMMARY OF THE INVENTION

Therefore, an object of the present invention is to provide vehicle impact detection system which can reliably predict occupant safety restraint deployment situations within a few milliseconds of an initial impact.

Another object of the present invention is to provide a vehicle impact detection system for controlling actuation of an occupant safety restraint device which can reliably predict and differentiate severe vehicle side impacts from minor side impacts.

A further object of the present invention is to provide a vehicle impact detection system which utilizes a two dimensional sensor output representative of the state of a monitored vehicle surface condition, and advanced array signal processing of the sensor output to reliably predict severe impacts within a few milliseconds of the initial contact.

In accordance with the present invention, a system for controlling actuation of a vehicle occupant safety restraint device in response to an impact with an outer surface of the vehicle comprises a sensor means affixed to the outer surface of the vehicle for generating a continuous, two dimensional output signal representative of a condition of the outer surface, and a processor means for monitoring the two dimensional sensor output signal. The processor means further comprises means for performing advanced array signal analysis on the continuous output signal to generate data representative of at least one criterion indicative of an impact with the outer surface, means for determining whether the generated data indicates an impact of sufficient severity to require actuation of the safety restraint device, and means controlled by the determining means for actuating the occupant safety restraint device in response to an impact of sufficient severity.

In further accordance with the present invention the sensor means comprises an array of sensor elements which each provide a continuous sensor output responsive to an impact on a predetermined area of the outer surface. The sensor elements are preferably formed from piezoelectric film and are arranged in a hexagonal array configuration. The at least one criterion comprises quantifying deformation, cracking and acceleration of the outer surface, wherein the outer surface comprises an outer side surface of the vehicle.

The present invention will be more fully understood upon reading the following detailed description of the preferred embodiment in conjunction with the accompanying drawings.

BRIEF DESCRIPTION OF THE DRAWINGS

FIG. 1 is a schematic block diagram illustrating a vehicle impact detection system in accordance with the present invention;

FIG. 2 is an illustration showing an embodiment of a sensor array in accordance with the present invention;

FIG. 3 is an illustration showing cracks in the side outer surface of a vehicle; and FIG. 4 is a graph showing the output of an individual sensor element in response to three different types of impacts.

DETAILED DESCRIPTION OF THE PREFERRED EMBODIMENT(S)

As shown in FIG. 1, the vehicle impact detection system 10 of the present invention comprises a sensor array 12 for providing continuous, two dimensional data output 14 representative of the state or condition of an outer surface such as the outer door skin, fenders, or other outer side surfaces 16 of a vehicle 18, and a processor/evaluation circuit 20 that utilizes a processing algorithm to perform advanced array signal processing on the continuous two dimensional data. As described hereinbelow, the processor and algorithm of the present invention provide an analysis of the sensed surface condition to distinguish deployment situations from nondeployment situations within a few milliseconds of an initial impact on the outer surface 16 contact.

As further illustrated in FIG. 1, the processor/evaluation circuit 20 stores sampled and processed sensor array data in a system memory 22 to allow the system 10 to track the condition of the outer surface over a period of time. Also, preestablished criteria indicative of different degrees of crash type and severity, such as surface deformation, cracking, and acceleration, can be stored in the system memory 22 to facilitate prediction of severe impacts to achieve the earliest reliable deployment of an occupant safety restraint device 24, such as an air bag, via an actuation circuit 26.

Processor 20 analyzes the two dimensional sensor output 14 to generate relevant information about the condition of the outer surface such as deformation, cracking, failure, and acceleration of such surfaces. Each of these types of surface conditions cause the sensor array to generate a distinct, characteristic output 14 indicative of the kind and severity of the impact to the surface. At the initial contact in a severe impact, the processor 10 determines severe impacts by detecting substantial deformation, cracking, surface failure, and acceleration occurring at several noncolinear points on the surface 16. As described below, by obtaining, tracking, and analyzing continuous information from a two dimensional array of locations, the processing algorithm advantageously utilizes techniques of advanced array signal processing to correlate the individual sensor element outputs.

In accordance with a preferred embodiment, each sensor element in the sensor array 12 comprises a strip or patch of piezoelectric film affixed to the outer surface 16 of the vehicle 18. The use of piezoelectric film advantageously allows each sensor element to provide a distinct output signal directly responsive to, and characteristic of, events such as deformation and cracking 30 of the outer surface 16, while being relatively inexpensive and easy to use. For example, FIG. 4 illustrates the voltage output generated by one of the piezoelectric film sensor elements in response to three different types of impacts on the outer surface 16. Output 32 shows a rap on the surface, output 34 shows a hammer blow on the surface, and output 36 shows a crash for which actuation of the safety restraint is desired. By continuously correlating and tracking a two dimensional array of outputs such as shown in FIG. 4, processor 20 can reliably predict deployment situations within a few milliseconds of the initial impact with the outer surface.

Because system 10 can reliably predict deployment situations within a few milliseconds, the present invention is particularly suited for use in controlling the actuation of an air bag in response to side impacts. However, one of ordinary skill in the art will readily appreciate that the usefulness of the present invention to predict severe surface impacts within a very restricted period of time is not limited solely to vehicle side impacts.

In further accordance with a preferred embodiment of the present invention as shown in FIG. 2, a hexagonal arrangement of sensor elements 28 advantageously provides optimal sensor coverage of the outer surface 16 (the dotted lines illustrating the zone of coverage for each sensor element). However, such an array arrangement is not to be construed as limiting since the teachings of the present invention merely require the sensor array to produce a continuous, two dimensional output representative of the outer surface condition. Therefore, one or ordinary skill in the art will appreciate other sensor arrangements employing fiber optic sensors or eddy current sensors can be utilized in any number of array configurations to generate the desired continuous, two dimensional sensor output.

It will be understood that the foregoing description of the preferred embodiment of the present invention is for illustrative purposes only, and that the various structural and operational features herein disclosed are susceptible to a number of modifications, none of which departs from the spirit and scope of the present invention as defined in the appended claims.

We claim:

1. A system for controlling actuation of a vehicle occupant safety restraint device in response to an impact with an outer surface of the vehicle comprising:
    a sensor means affixed to the outer surface of the vehicle for generating a continuous, two dimensional analog output signal representative of a condition of the outer surface; and
    a processor means for monitoring the two dimensional sensor output signal, said processor means further comprising:
    means for performing signal analysis on said continuous output signal to generate data representative of at least one criterion indicative of an impact with the outer surface;
    means for determining whether said generated data indicates an impact of sufficient severity to require actuation of the safety restraint device; and
    means controlled by said determining means for actuating the occupant safety restraint device in response to an impact of sufficient severity.

2. The system of claim 1 wherein said sensor means comprises an array of sensor elements which each provide a continuous sensor output responsive to an impact on a predetermined area of the outer surface.

3. The system of claim 2 wherein said array of sensor elements are arranged in a hexagonal array.

4. The system of claim 1 wherein said determining means comprises means for determining within a few milliseconds of an initial impact whether the impact is of sufficient severity to require actuation of the safety restraint device.

5. The system of claim 1 wherein said at least one criterion comprises deformation in the outer surface.

6. The system of claim 1 wherein said at least one criterion comprises cracking in the outer surface.

7. The system of claim 1 wherein the outer surface comprises an outer side surface of the vehicle.

8. A system for controlling actuation of a vehicle occupant safety restraint device in response to an impact with an outer surface of the vehicle comprising:
    a sensor means affixed to the outer surface of the vehicle for generating a continuous, two dimensional output signal representative of a condition of the outer surface, said sensor means comprising an array of sensor elements formed from piezoelectric film; and
    a processor means for monitoring the two dimensional sensor output signal, said processor means further comprising:
    means for performing signal analysis on said continuous output signal to generate data representative of at least one criterion indicative of an impact with the outer surface;
    means for determining whether said generated data indicates an impact of sufficient severity to require actuation of the safety restraint device; and
    means controlled by said determining means for actuating the occupant safety restraint device in response to an impact of sufficient severity.

9. A system for controlling actuation of a vehicle occupant safety restraint device in response to an impact with an outer surface of the vehicle comprising:

a sensor means affixed to the outer surface of the vehicle for generating a continuous, two dimensional output signal representative of a condition of the outer surface; and a processor means for monitoring the two dimensional sensor output signal, said processor means further comprising:

means for performing signal analysis on said continuous output signal to generate data representative of at least one criterion indicative of an impact with the outer surface, wherein said at least one criterion comprises acceleration of the outer surface;

means for determining whether said generated data indicates an impact of sufficient severity to require actuation of the safety restraint device; and means controlled by said determining means for actuating the occupant safety restraint device in response to an impact of sufficient severity.

* * * * *